US009712443B1

(12) United States Patent
Phaal

(10) Patent No.: US 9,712,443 B1
(45) Date of Patent: Jul. 18, 2017

(54) DISTRIBUTED TRAFFIC QUOTA MEASUREMENT AND ENFORCEMENT

(75) Inventor: Peter Phaal, San Francisco, CA (US)

(73) Assignee: InMon Corp., San Francisco, CA (US)

( * ) Notice: Subject to any disclaimer, the term of this patent is extended or adjusted under 35 U.S.C. 154(b) by 0 days.

(21) Appl. No.: 12/492,703

(22) Filed: Jun. 26, 2009

Related U.S. Application Data

(60) Provisional application No. 61/077,075, filed on Jun. 30, 2008.

(51) Int. Cl.
*H04L 1/00* (2006.01)
*H04L 12/801* (2013.01)
*H04L 12/26* (2006.01)
*H04L 29/06* (2006.01)

(52) U.S. Cl.
CPC ............. *H04L 47/10* (2013.01); *H04L 47/12* (2013.01); *H04L 43/00* (2013.01); *H04L 43/16* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 5,615,323 A | 3/1997 | Engel et al. | |
| 5,790,799 A | 8/1998 | Mogul | |
| 6,085,243 A | 7/2000 | Fletcher et al. | |
| 6,170,022 B1 * | 1/2001 | Linville ............... | H04L 47/10 370/227 |
| 6,529,475 B1 | 3/2003 | Wan et al. | |
| 6,636,512 B1 * | 10/2003 | Lorrain et al. ............... | 370/392 |
| 6,678,245 B1 * | 1/2004 | Cooper et al. ............... | 370/230 |
| 6,771,646 B1 | 8/2004 | Sarkissian et al. | |
| 6,795,400 B1 * | 9/2004 | Schick .......................... | 370/236 |
| 6,826,150 B1 * | 11/2004 | Bhattacharya et al. ...... | 370/230 |
| 6,934,249 B1 | 8/2005 | Bertin et al. | |
| 7,028,088 B1 | 4/2006 | Koperda et al. | |
| 7,113,477 B1 * | 9/2006 | O'Toole ........................ | 370/229 |
| 7,133,365 B2 | 11/2006 | Klinker et al. | |
| 7,139,274 B2 | 11/2006 | Attar et al. | |

(Continued)

FOREIGN PATENT DOCUMENTS

GB 2438454 A * 11/2007

OTHER PUBLICATIONS

Brownlee, "Traffic Flow Measurements: Meter MIB," Network Working Group, The University of Aukland, RFC 2064, Jan. 1997, pp. 1-36.
Claffy et al., "Application of Sampling Methodologies to Network Traffic Characterization," Computer Systems Laboratory, 1993, pp. 1-10.

(Continued)

*Primary Examiner* — Kibrom T Hailu
(74) *Attorney, Agent, or Firm* — Kilpatrick Townsend & Stockton LLP

(57) ABSTRACT

A network traffic controller includes components adapted to receive traffic from a multitude of switches and to compare the traffic data to one or more threshold values. The threshold values may represent usage quotas. If the traffic generated by a host is detected as exceeding such usage quota, a traffic control signal is sent to the switch connecting the host to the network. The control signal may instruct the switch to mark the associated host's traffic as low priority, or rate limit the interface so as to limit the amount of traffic that is allowed onto the network, or block the traffic altogether.

18 Claims, 1 Drawing Sheet

(56) References Cited

U.S. PATENT DOCUMENTS

| | | | |
|---|---|---|---|
| 7,164,657 | B2 | 1/2007 | Phaal |
| 7,197,008 | B1 | 3/2007 | Shabtay et al. |
| 7,209,434 | B2 | 4/2007 | Kano et al. |
| 7,478,156 | B1 | 1/2009 | Pereira |
| 7,486,696 | B2 * | 2/2009 | Garg et al. ............... 370/468 |
| 7,876,681 | B2 * | 1/2011 | Pan et al. ................. 370/232 |
| 7,895,299 | B2 * | 2/2011 | Betts et al. .............. 709/220 |
| 8,005,009 | B2 | 8/2011 | McKee et al. |
| 8,145,760 | B2 | 3/2012 | Dinda et al. |
| 8,798,056 | B2 | 8/2014 | Ganga |
| 2003/0016626 | A1 * | 1/2003 | Lagerberg .......... H04L 12/5695 370/230.1 |
| 2003/0048749 | A1 | 3/2003 | Stamatelakis et al. |
| 2003/0128710 | A1 | 7/2003 | Fedyk et al. |
| 2003/0198190 | A1 | 10/2003 | Rajant et al. |
| 2004/0190444 | A1 | 9/2004 | Trudel et al. |
| 2004/0190527 | A1 * | 9/2004 | Okura ................. H04L 45/00 370/395.21 |
| 2004/0213155 | A1 | 10/2004 | Xu et al. |
| 2005/0052992 | A1 * | 3/2005 | Cloonan et al. ............ 370/229 |
| 2005/0111367 | A1 * | 5/2005 | Jonathan Chao et al. .... 370/235 |
| 2005/0286434 | A1 | 12/2005 | McKee et al. |
| 2006/0050634 | A1 | 3/2006 | Gous |
| 2007/0081543 | A1 * | 4/2007 | Brenes et al. ............. 370/401 |
| 2007/0250642 | A1 | 10/2007 | Thubert et al. |
| 2011/0004698 | A1 | 1/2011 | Wu |
| 2011/0282986 | A1 | 11/2011 | Phaal |

OTHER PUBLICATIONS

Non-Final Office Action for U.S. Appl. No. 10/877,853, mailed on Aug. 21, 2007, 27 pages.
Non-Final Office Action for U.S. Appl. No. 10/877,853, mailed on Jun. 6, 2008, 28 pages.
Non-Final Office Action for U.S. Appl. No. 10/877,853, mailed on Feb. 26, 2009, 15 pages.
Final Office Action for U.S. Appl. No. 10/877,853, mailed on Jul. 30, 2009, 14 pages.
Non-Final Office Action for U.S. Appl. No. 10/877,853, mailed on Mar. 16, 2010, 13 pages.
Non-Final Office Action for U.S. Appl. No. 10/877,853, mailed on Dec. 7, 2010, 13 pages.
U.S. Appl. No. 12/946,102, filed Nov. 15, 2010, Phaal.
Notice of Allowance for U.S. Appl. No. 10/877,853, mailed Jun. 2, 20011, 8 pages.
Non-Final Office Action for U.S. Appl. No. 12/946,102 mailed on Dec. 7, 2012, 23 pages.
Final Office Action for U.S. Appl. No. 12/946,102 mailed Sep. 10, 2013, 23 pages.
Non-Final Office Action for U.S. Appl. No. 12/946,102 mailed on Aug. 7, 2014, 23 pages.
Final Office Action for U.S. Appl. No. 12/946,102 mailed on Mar. 23, 2015, 26 pages.
Non-Final Office Action for U.S. Appl. No. 12/946,102 mailed on Jan. 4, 2016, 22 pages.
Notice of Allowance for U.S. Appl. No. 12/946,102 mailed on Jun. 15, 2016, 18 pages.

* cited by examiner

DISTRIBUTED TRAFFIC QUOTA MEASUREMENT AND ENFORCEMENT

CROSS-REFERENCES TO RELATED APPLICATIONS

The present application claims benefit under 35 USC 119(e) of U.S. provisional application No. 61/077,075, filed Jun. 30, 2008, entitled "Distributed Traffic Quota Measurement And Enforcement", the content of which is incorporated herein by reference in its entirety.

The present application is related to U.S. application Ser. No. 10/877,853, filed Jun. 25, 2004, entitled "Methods and Computer Programs for Generating Data Traffic Matrices", the content of which is incorporated herein by reference in its entirety.

BACKGROUND OF THE INVENTION

Network traffic shaping by enforcing usage quotas is known. Conventionally, shaping of network traffic is carried out within a stand-alone device through which the traffic flows. Accordingly, the traffic measurement, the calculation of quotas and the enforcement functions are handled by the device. Conventional traffic shaping techniques have a number of shortcomings. For example, their lack of scalability with respect to the number of wide area network WAN and Internet connections, connection speed, or number of users continue to limit their usage and pose challenging tasks.

BRIEF SUMMARY OF THE INVENTION

A network traffic controller, in accordance with one embodiment of the present invention, includes components adapted to receive traffic from a multitude of switches and to compare the traffic data to one or more threshold values. The threshold values may represent usage quotas. If the traffic generated by a host is detected as exceeding such usage quota, a traffic control signal is sent to the switch connecting the host to the network. The control signal may instruct the switch to mark the associated host's traffic as low priority, or rate limit the interface so as to limit the amount of traffic that is allowed onto the network, or block the traffic altogether. After detecting that the traffic on the host has fallen below the usage quota, the control is removed.

DETAILED DESCRIPTION OF THE INVENTION

In accordance with one embodiment of the present invention, traffic shaping and control is distributed throughout the network and is made scalable. Both the measurement of the traffic and its enforcement policies are distributed via network devices, such as switches, routers, and the like, all of which devices are collectively and alternatively referred to herein as switches. Such network devices provide measurements to a controller that is adapted to analyze the measurements, calculate quotas and provide distributed application control signals back to the network devices. In one embodiment, a network device, such as a switch, router, etc., collects information about the traffic flows throughout the network. The switch may monitor the traffic flow in accordance with the sFlow® traffic monitoring protocol, as described, for example, in U.S. Pat. No. 7,164,657, the content of which is incorporated herein by reference in its entirety. Other traffic measurement systems such as NetFlow™ may also be used.

Figure 1:
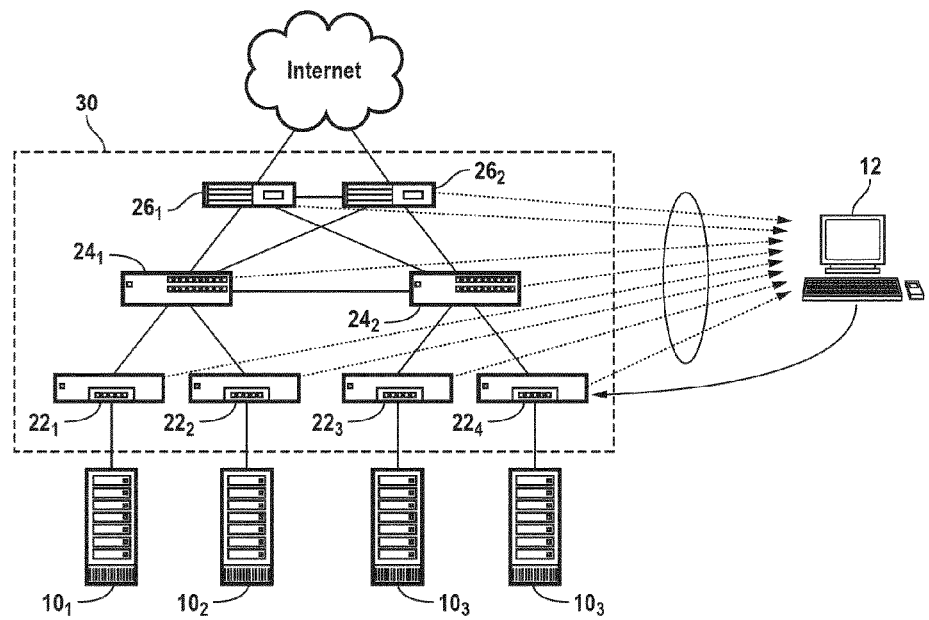
FIG. 1 is a block diagram of a traffic controller adapted to control the traffic to and from a multitude of hosts via a number of switches and routers, in accordance with one exemplary embodiment of the present invention.

FIG. 1 shows a traffic controller 12 controlling a multitude of switches configured to connect a multitude of hosts to each other and to the Internet, in accordance with one exemplary embodiment of the present invention. Four exemplary hosts $10_1$, $10_2$, $10_3$, $10_4$ (alternatively and collectively referred to as host 10), are shown as being in communication with the Internet via switches $22_1$, $22_2$, $22_3$, $22_4$, (alternatively and collectively referred to as switch 22), switches $24_1$, $24_2$ (alternatively and collectively referred to as switch 24), and switches $26_1$, $26_2$ (alternatively and collectively referred to as switch 26).

Switches 22 are configured to measure and supply to controller 12 the amount of network traffic consumed by the hosts 10. For example, traffic associated with host $10_1$ may be observed by multiple switches 22, depending on the communication path. For example, traffic between host $10_1$ and the Internet may be observed on switches $22_1$ $24_1$ and $26_1$. The controller 12 uses the traffic observations from the switches 22 to determine the amount of network traffic consumed by host $10_1$. The redundancy built into the monitoring ensures that traffic is accurately accounted for even when devices fail or network paths are altered. This enable controller 12 to be kept up-to-date on the traffic state of the network. In response, controller 12 compares the bandwidth used by each host 10 to one or more threshold values to determine if that host is consuming excess bandwidth. The threshold values, representing quotas, may be applied over different time scales. Furthermore, different quotas may be applied to different groups (or classes) of hosts. For example, controller 12 may apply quota $Q_1$ to the group of users assigned with, e.g., host $10_1$, while applying quota $Q_2$ that is greater than $Q_1$, to the group of users assigned with, e.g., host $10_2$.

When a host, such as host $10_1$, is detected as having exceeded its quota, a control signal generated by controller 12 is applied to that host to reduce the amount of bandwidth that, e.g., host $10_1$ is consuming. To achieve this, controller 12 locates switch $22_1$ and the interface connecting this host to the network and applies a control signal to switch $22_1$ to reduce the amount of bandwidth consumed by host $10_1$. Such control may be achieved by (i) marking the host's traffic as low priority so that this traffic can be discarded in other parts of the network (usually the WAN router) if a link is congested, (ii) rate limiting the interface so as to limit the amount of traffic that is allowed onto the network, or (iii) disabling the interface or blocking the traffic so that it is not allowed on the network. Upon detecting that the traffic on the host has fallen below the quota, the control is removed. The quota may include hysteresis, i.e. the threshold to release a control may be lower than the threshold to add the control. Hysteresis helps to limit the number of control actions required to control the network traffic. Controller 12 combines the traffic monitoring and control capabilities of existing network switches to provide effective network-wide traffic control.

Controller 12 provides a number of advantages. First, because the controls are distributed among a large number of access switches in the network, as the number of switches increases, so does the number of possible controls since each switch adds additional hardware that can be used to implement controls. In other words, embodiments of the present invention provide a highly scalable traffic measurement and shaping system. In addition, because many of the commercially available switches have the capability to measure traffic, no additional hardware is required in implementing the embodiments of the present invention. Furthermore, because switches often include Application Specific Integrated Circuits (ASICs), embodiments of the present invention are run at wire speed. The visibility and control that controller 12 provides in identifying and eliminating wasteful traffic ensures quality of service during peak periods. Moreover, costly and unnecessary upgrades are avoided as information is provided to target network spending to areas where it will be most effective.

Since traffic measurement is performed by the switches, and the control signals are also applied to the switches, as more hosts are added, the corresponding increase in the number of switches enables more traffic measurement and more control of any increase in traffic. In other words, a traffic shaping system, in accordance with embodiments f the present invention, is distributed throughout the network and is highly scalable. In one embodiment, the control signals are applied to edge switches 22. In other embodiments, the control signals may applied to the switches 24 and 26. Since the switches may be configured to both (i) measure traffic and (ii) control the bandwidth in accordance with the control signals they receive from traffic controller 12, embodiments of the present invention provide a closed-loop traffic control system that is centrally controlled and globally optimized, while concurrently providing a distributed measurement system that is readily scalable.

Rate limiting control is applied to the edge switches. Packet marking and setting of priorities may be distributed throughout the network. In other words, packet marking is a network wide configuration, thus requiring many of the switches and routers to be configured to support the quality of service class.

The protocol described in sFlow provides real-time measurements as there is negligible delay between the traffic crossing the switch and the controller receiving sFlow® information about the traffic. A traffic monitoring system in compliance with sFlow® scales well. For example, in one embodiment, a thousand switches may be monitored and controlled from a single controller 12. The measurement technology itself doesn't cause network congestion or create performance problems on the switches. As described above, other alternative measurement technologies that may be used in accordance with various distributed traffic shaping embodiment of the present invention include Cisco's Net-Flow™, and IPFIX™

Figure 2:
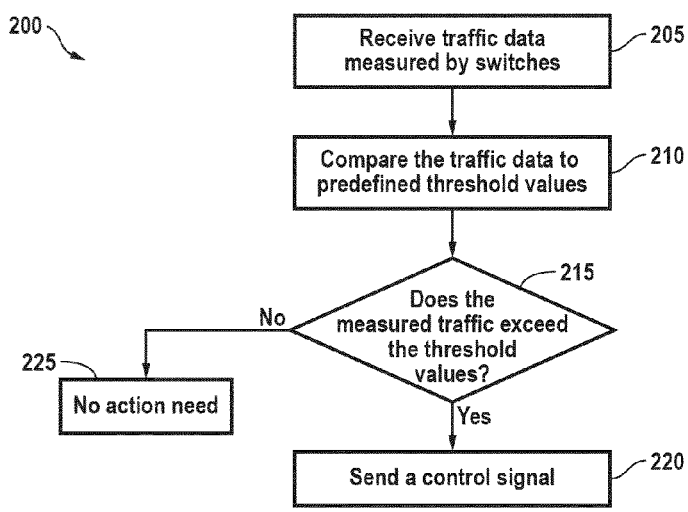
FIG. 2 is a flowchart of steps performed to control traffic, in accordance with one embodiment of the present invention.

FIG. 2 is a flowchart 200 of steps performed to monitor and enforce network control, in accordance with one embodiment of the present invention. Measured traffic data are received 205 from the switches disposed throughout the network. The measured traffic is thereafter compared to predefined threshold values representing usage quotas. If the comparison operations shows that the measured traffic exceeds 215 the predefined threshold values, a control signal is applied 220 to the switches to either mark the traffic as low priority so that this traffic can be discarded, or rate limit the associated interface so as to limit the amount of traffic that is allowed onto the network, or disable the associated interface through which the traffic passes. If the comparison operations shows that the measured traffic does not exceeds 215 the predefined threshold values, no action is taken.

Enforcing Usage Quotas

Quotas are an effective mechanism for controlling Internet usage. As is well known, a quota represents the maximum amount of data that a user is allowed per time period. If a user exceeds this quota then his/her traffic is controlled so that it doesn't interfere with the traffic allowed to other users.

Quotas are particularly effective for managing peer-to-peer (p2p) activity. Peer-to-peer applications (and users) are good at getting through access control lists by using non-standard ports, such as port 80. Trying to maintain an effective filter to identify p2p traffic is a challenge, and the resulting complex rule sets consume significant resources in the devices attempting to perform the classification. A simple usage quota is easier to maintain and enforce and encourages users to be more responsible in their use of shared resources. Another benefit of quota based controls is that they don't encourage users to tailor p2p application setting to bypass acl rules, thereby making it easier to monitor traffic. A quota system may also be implemented using standard network hardware.

Detection

In order to manage traffic effectively, in one exemplary embodiment, the traffic monitoring system is configured to include zones and groups containing the IP address space of the hosts. This enables setting quotas by the zone and to determine if traffic is local or off-site. The pseudo-code shown in the attached Appendix A identifies hosts within selected zones that have exceeded their quotas.

The quotas are expressed as the number of bytes allowed per day to the outside world (i.e. local traffic on site is not counted). Once the traffic information has been obtained, each host's byte count is compared with its quota. The hosts exceeding their quotas are kept track of. The pseudo-code in Appendix A identifies the MAC address associated with each host and uses the MAC addresses to identify the switch and port connecting the host to the network. The output of the code has one row for each host that has exceeded its quota.

Enforcement

The information provided by the detection pseudo-code offers a number of enforcement options, including (i) disabling the switch port, (ii) rate limiting the switch port; and (iii) lowering the priority of the host's traffic. Disabling the switch port is typically only appropriate in emergencies if host is a security threat or is creating a broadcast storm, etc. Rate limiting the switch port may cause problems if more than one host is connected to the port. Control is excessive in such cases since it applies to all network activity while only the off-site traffic requires control. To lower the priority of the host's traffic, packets are marked as discardable if congestion occurs. Accordingly, this is selective applied and only impacts the users on congested links.

Assume that a site access router uses Differentiated Services Code Point (DSCP) policies to prioritize traffic. The packets may be marked as having low priority on the access switch as this distributes the task of traffic classification among the edge switches, thereby reducing the load on the core and allowing a relatively larger number of controls to be applied. Accordingly, the packets are not dropped unnecessarily. Priority queuing will only drop packets if there is congestion. Local traffic is unlikely to be affected and off-site traffic will only be affected during peak periods. The pseudo-code shown in the attached Appendix B automates the steps needed to make a configuration change to a ProCurve switch, commercially available from Hewlett-Packard (HP) Corporation. The pseudo-code shown in the attached Appendix C brings together the detection and enforcement mechanisms to automatically enforce the quotas. The attached Appendix D provides step by step instructions for configuring Traffic Sentinel™'s traffic control function. Traffic Sentinel™ is a traffic controller commercially available from InMon Corporation, located at 580 California Street, 5$^{th}$ floor, San Francisco, Ca 94014. The example shown in Appendix D is provided with reference to controlling p2p traffic on a university campus. However, it is understood that embodiments of the present invention may be used in other settings for enforcement of any other policy.

The above embodiments of the present invention are illustrative and not limiting. Various alternatives and equivalents are possible. The invention is not limited by the type or the number of switches, routers, etc. The inventions is not limited to the connection speed or the protocol governing the transfer of packets. Other additions, subtractions or modifications are obvious in view of the present disclosure and are intended to fall within the scope of the appended claims.

What is claimed is:

1. A traffic controller coupled to a plurality of switches distributed within a network and configured to:
   directly receive a measure of traffic from each of the plurality of switches, the measure of traffic being associated with each of a plurality of hosts connected to the switches;
   compare the measured traffic associated with each host to one or more threshold values; and
   send a traffic control signal to the switch whose corresponding host's measured traffic satisfies the one or more threshold values,
   wherein the traffic controller is the only controller operable to directly send traffic control signals to all of the switches distributed within the network, and the traffic controller does not send data that is not traffic control signals to another device.

2. The traffic controller of claim 1 wherein in response to the traffic control signal, a rate at which packets are transmitted by the corresponding host is limited.

3. The traffic controller of claim 1 wherein in response to the traffic control signal, traffic flow from one or more of the hosts via the one or more of the plurality of switches is blocked.

4. The traffic controller of claim 1 wherein in response to the traffic control signal, packets flowing from one or more of the hosts via the one or more of the plurality of switches are marked as low priority packets.

5. The traffic controller of claim 1 wherein said traffic controller is adapted to compare a first measured traffic associated with a first one of the plurality of hosts to a first threshold value and to compare a second measured traffic associated with a second one of the plurality of hosts to a second threshold value.

6. A method of controlling traffic by a traffic controller coupled to a plurality of switches distributed within a network, the method comprising:
   directly receiving a measure of traffic from each of the plurality of switches by the traffic controller, the measure of traffic being associated with each of a plurality of hosts;
   comparing the measured traffic associated with each host to one or more threshold values by the traffic controller; and
   sending a traffic control signal from the traffic controller to the switch whose corresponding host's measured traffic satisfies the one or more threshold values,
   wherein the traffic controller is the only controller operable to directly send traffic control signals to all of the switches distributed within the network, and the traffic controller does not send data that is not traffic control signals to another device.

7. The method of claim 6 further comprising:
   limiting a rate at which packets transmitted by the corresponding host in response to the traffic control signal.

8. The method of claim 6 further comprising:
   blocking traffic flowing from one or more of the hosts via the one or more of the plurality of switches in response to the traffic control signal.

9. The method of claim 6 further comprising:
   marking packets flowing from one or more of the hosts via the one or more of the plurality of switches in response to the traffic control signal.

10. The method of claim 9 further comprising:
    comparing a first measured traffic associated with a first one of the plurality of hosts to a first threshold value; and
    comparing a second measured traffic associated with a second one of the plurality of hosts to a second threshold value.

11. The traffic controller of claim 1 wherein the one or more of the plurality of switches receiving the traffic control signal are edge switches.

12. The method of claim 6 wherein the one or more of the plurality of switches receiving the traffic control signal are edge switches.

13. The traffic controller of claim 1 wherein the one or more threshold values comprise a hysteresis.

14. The traffic controller of claim 1 wherein the one or more threshold values are applied over different time scales.

15. The method of claim 6 further comprising:
    applying the one or more threshold values over different time scales.

16. The method of claim 6 wherein the one or more threshold values comprise a hysteresis.

17. A network comprising:
    a plurality of switches distributed within the network;
    a plurality of hosts, each host corresponding to a different one of the switches;
    a traffic controller directly coupled to all of the switches distributed within the network and configured to directly receive a measure of traffic from each of the plurality of switches, the measure of traffic being associated with each of the hosts and directly send a traffic control signal to the switch whose corresponding host's measured traffic satisfies the one or more threshold values,
    wherein the measure of traffic associated with each host is performed by a switch associated with that host, and
    wherein the traffic controller does not send data that is not a traffic control signal to another device.

18. The network of claim 17 wherein the one or more threshold values are applied over different time scales.

* * * * *